United States Patent
Bregman

(10) Patent No.: US 11,550,697 B2
(45) Date of Patent: Jan. 10, 2023

(54) CROSS JOBS FAILURE DEPENDENCY IN CI/CD SYSTEMS

(71) Applicant: Red Hat, Inc., Raleigh, NC (US)

(72) Inventor: Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 55 days.

(21) Appl. No.: 16/431,658

(22) Filed: Jun. 4, 2019

(65) Prior Publication Data

US 2020/0387441 A1 Dec. 10, 2020

(51) Int. Cl.
*G06F 11/36* (2006.01)

(52) U.S. Cl.
CPC ...... *G06F 11/3624* (2013.01); *G06F 11/3612* (2013.01)

(58) Field of Classification Search
CPC .................. G06F 11/3624; G06F 11/3612
USPC ........................................................ 717/131
See application file for complete search history.

(56) References Cited

U.S. PATENT DOCUMENTS

| | | | | |
|---|---|---|---|---|
| 8,037,453 | B1 * | 10/2011 | Zawadzki | G06F 8/71 |
| | | | | 717/123 |
| 8,875,091 | B1 * | 10/2014 | Rouleau | G06F 8/10 |
| | | | | 717/101 |
| 10,198,344 | B2 | 2/2019 | Vyas et al. | |
| 2015/0100945 | A1 * | 4/2015 | Nadar | G06F 8/40 |
| | | | | 717/121 |
| 2015/0106790 | A1 * | 4/2015 | Bigwood | G06F 11/3624 |
| | | | | 717/127 |
| 2017/0060546 | A1 * | 3/2017 | Prasad | G06F 11/0793 |
| 2017/0357485 | A1 * | 12/2017 | Rees | G06F 8/71 |
| 2018/0052762 | A1 * | 2/2018 | Vyas | G06F 11/3668 |
| 2018/0314953 | A1 * | 11/2018 | Benedict | G06N 20/00 |
| 2019/0065357 | A1 * | 2/2019 | Brafman | G06F 11/3692 |
| 2019/0102244 | A1 * | 4/2019 | Tarlano | G06N 5/022 |
| 2019/0155722 | A1 * | 5/2019 | Gupta | G06F 11/008 |
| 2020/0089485 | A1 * | 3/2020 | Sobran | G06F 8/65 |

FOREIGN PATENT DOCUMENTS

| | | |
|---|---|---|
| CN | 105335284 B | 12/2018 |
| CN | 109408382 A | 3/2019 |

OTHER PUBLICATIONS

Santolucito, M., et al., "Statically Verifying Continuous Integration Configurations," vol. 1, No. 1, May 2018, Yale University.
Spragins, P., et al., "Efficacy Presubmit," Sep. 17, 2018, Google Testing Blog, 7 pages. Retreived from: https://testing.googleblog.com/2018/09/efficacy-presubmit.html.

* cited by examiner

*Primary Examiner* — Lewis A Bullock, Jr.
*Assistant Examiner* — Theodore E Hebert
(74) *Attorney, Agent, or Firm* — Womble Bond Dickinson (US) LLP

(57) ABSTRACT

A build fail of a job in a development pipeline of an application development system is analyzed. A determination as to whether the build fail affects other jobs in the development pipeline is made. In response to determining that the build fail affects at least one of the other jobs of the plurality of jobs, an alert identifying the at least one of the other jobs affected by the build fail is generated.

8 Claims, 8 Drawing Sheets

US 11,550,697 B2

CROSS JOBS FAILURE DEPENDENCY IN CI/CD SYSTEMS

TECHNICAL FIELD

Aspects of the present disclosure relate to application development systems, development pipelines, and more particularly, to software jobs in an application development pipeline.

BACKGROUND

An application may be one or more programs (e.g., computer programs), software, etc., that may be used by users, other applications, devices, etc., to perform various tasks, actions, functions, operations, methods, processes, calculations, etc. Examples of applications include web applications, enterprise applications, consumer applications, mobile applications, etc. An application may be divided into multiple components, modules, portions, etc. Each component, module, portion, etc., may perform different functions, operations, actions, processes, methods, etc., for the application, and may provide different services, functionalities, or resources for the application. Software jobs in a development pipeline of an application development system perform builds of applications for development, various types of testing, and deployment of applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
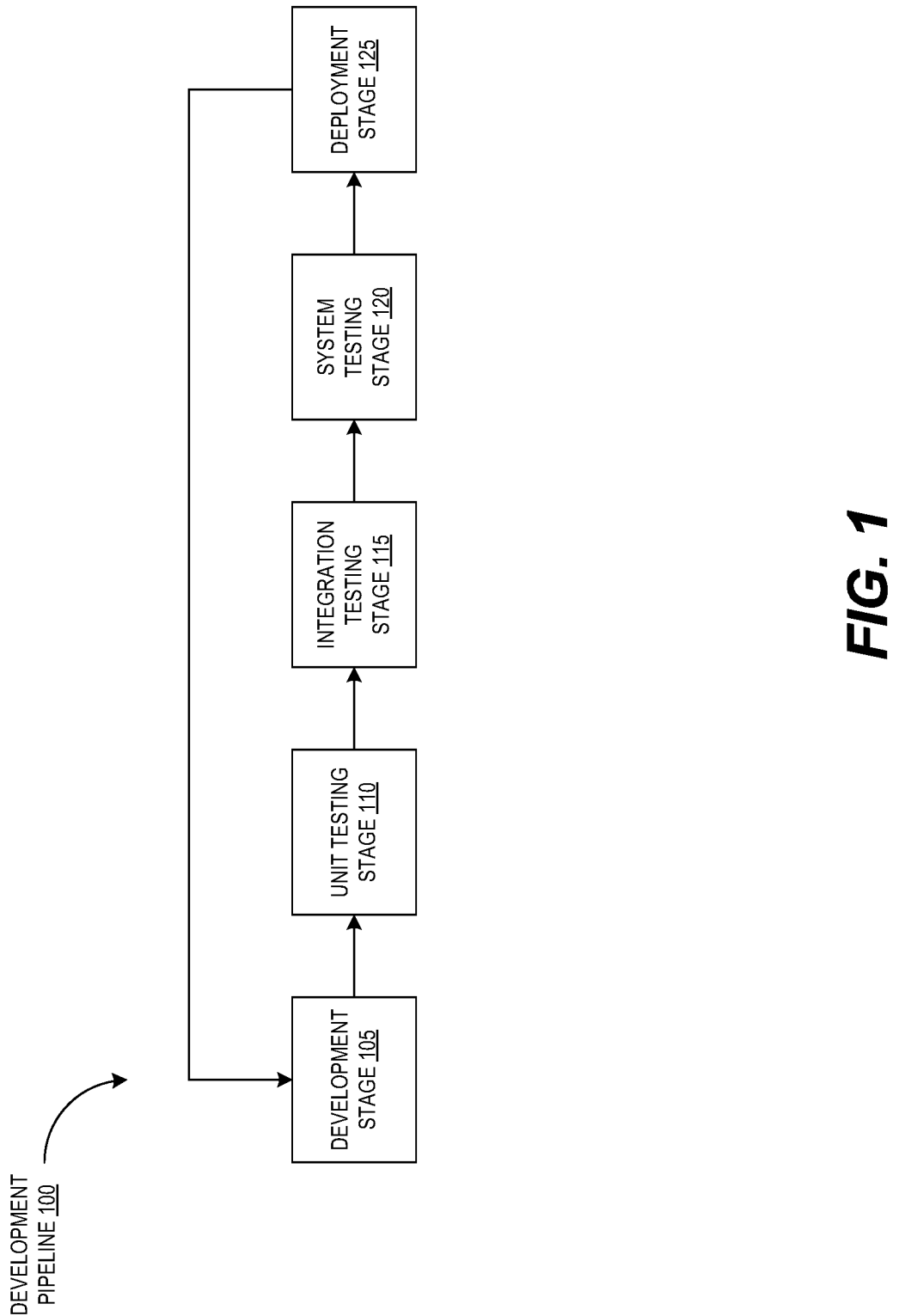
FIG. 1 is a block diagram that illustrates an example development pipeline, in accordance with some embodiments of the present disclosure.

An application development system is described herein, which may be used for developing applications and monitoring software jobs in a development pipeline. The system monitors software jobs, identifies and analyzes build fails of software jobs, and identifies and alerts regarding software jobs affected by build fails. With awareness of such alerts, a system administrator or other user (or, in further embodiments the system itself) may decide whether to continue, discontinue, remove, delay or debug a software job that is in the pipeline and is identified as affected by a build fail.

As discussed above, an application may be one or more programs (e.g., computer programs), software, etc., that may be used by users, other applications, devices, etc., to perform various tasks, actions, functions, operations, methods, processes, calculations, etc. The application may be divided into components, modules, portions, etc., that may perform different functions, operations, actions, processes, methods, etc., for the application, and may provide different services, functionalities, or resources for the application. The process or cycle for developing (e.g., created, coded, implemented, etc.), testing, and maintaining the application (or the modules and components of the application) may be referred to as a development pipeline. The development pipeline may also be referred to as an application development pipeline, a development cycle, an application development cycle, etc.

A development system may be used to develop, test, deploy, or maintain an application. For example, a development system may be used by programmers or developers to implement (e.g., code) the application. In another example, the development system may be used by programmers or developers to test portions or all of the application. In a further example, the development system may be used to deploy the application to users (e.g., to end users of the application). The development pipeline for an application may include various jobs that utilize one or more builds including code for the application.

Builds utilized by jobs in the development pipeline may result in an error/failure, such as a syntax error. The failure may be triggered during an execution of a first job of the development pipeline. However, users associated with other jobs utilizing the build may be unaware of the failure. Accordingly, the other jobs utilizing the build may also subsequently fail in the same manner.

The present disclosure addresses the above-noted and other deficiencies generating an alert for jobs in a development pipeline that utilize a build that is known to fail. This may allow for a user to identify a job that includes a build that is known to or is likely to fail. The user may then take appropriate remedial action. For example, the user may correct the build that has experienced the failure, determine to not trigger the job(s) that utilize the build, etc. By providing an alert of jobs that utilize a build that is known to fail or is likely to fail, the triggering of jobs that will likely fail may be prevented, improving the performance of the application development system. Furthermore, the alert may notify a user to correct the build so that jobs utilizing the build may be triggered without experiencing a failure, improving the performance of the application development system.

FIG. 1 is a block diagram that illustrates an example development pipeline 100, in accordance with some embodiments of the present disclosure. As discussed above, an application may be one or more programs (e.g., computer programs), software, software applications, etc., that may be used by users, other applications, devices, etc., to perform various tasks, actions, functions, operations, methods, processes, calculations, etc. The process or cycle for developing (e.g., created, coded, implemented, etc.), testing, deploying, and maintaining an application may be referred to as a development pipeline. The development pipeline (or process) may be a cyclical pipeline, as discussed in more detail below. One type of development pipe line may be a continuous integration continuation delivery (CI/CD) pipeline. A CI/CD pipeline may be a pipeline or process where an application, or modules and components of the application, are built (e.g., compiled), tested, and deployed (e.g., released to users) in shorter time periods. For example, new code for the application may be built, tested, and deployed every few hours, every day, or every appropriate time period. The testing of the application, or modules and components of the application, may be performed when code (e.g., source code, programming code, etc.) is checked into a version control system (e.g., a source control system, a code repository, etc.). For example, testing of the application may be performed automatically when new code for the application is checked in. The deployment of the application, or modules and components of the application may be performed when the testing of the application (or modules and components of the application) has been completed. For example, the application may be automatically deployed when the testing of the application has been completed.

In one embodiment, the development pipeline 100 illustrated in FIG. 1 may be an example of a CI/CD pipeline. The development pipeline 100 includes a development stage 105, a unit testing stage 110, an integration testing stage 115, a system testing stage 120, and a deployment stage 125. The stages illustrated in FIG. 1 are merely examples, and different stages may be used in the development pipeline 100 in other embodiments. For example, additional stages may be included in the development pipeline 100. In another example, one of the stages in the development pipeline 100 may be divided into multiple stages.

In one embodiment, developers, coders, programmers, etc., may modify the application during the development stage 105. For example, developers may write code, add code, update code, modify code, fix bugs, add new features, add security fixes, enhance existing features, etc., during the development stage 105. The development stage 105 may end when the developers, coders, programmers, etc., check in code to a version control system (e.g., a source control system, a code repository, etc.). In one embodiment, one or more components, modules, units, portions, etc., of the application may be testing during the unit testing stage 110. For example, smaller portions (e.g., single modules) of the application may be tested during the unit testing stage 110. The unit testing stage 110 may start after the development stage 105. For example, unit tests (for the unit testing stage 110) may be automatically started or performed after the developers, coders, programmers, etc., check in their code to the version control system.

In one embodiment, individual components, modules, units, portions, etc., of the application may be combined and tested as a group during the integration testing stage 115. For example, multiple modules (e.g., two, three, or some other appropriate number of modules) may be combined and tested together as a single module. The integration testing stage 115 may start after the unit tests for the individual components, modules, units, portions, etc., of the application that are to be combined and tested as a group are completed. For example, integration testing stage 115 may start after all or a threshold number of the unit tests for the individual components, modules, units, portions, etc., of the application, have passed.

In one embodiment, the complete or integrated application may be tested during the system testing stage 120. During the system testing stage 120, the application may be tested to determine if the application is in compliance with different requirements. For example, the application may be tested to determine whether certain features operate as specified in a design document. In another example, the application may be tested to determine whether the application can perform different operations, functions, actions, etc., within a specified period of time.

In one embodiment, the application may be deployed (e.g., installed, updated, etc.) onto various computing devices during the deployment stage 125. For example, the application or portions of the application may be installed on to different server computing devices, client computing devices, etc., during the deployment stage 125. The deployment stage 125 may include various types of deployments. For example, the deployment stage 125 may include a test deployment where the application is deployed to a subset of computing devices that have the application installed. This may allow the developers to see how the application performs on the subset of computing devices before deploying the application to all of the computing devices that have the application installed.

In one embodiment, the development pipeline 100 may be a cyclical pipeline or processes. For example, the development pipeline 100 may proceed from the deployment stage 125 back to the development stage 105, after the deployment stage 125 has been completed. Thus, a later stage in the development pipeline 100 may refer to an earlier stage in the development pipeline. For example, a later stage after the deployment stage 125 may refer to the development stage 105 of the unit testing stage 110.

As discussed above, the development pipeline 100 may include fewer, more, or different stages than those illustrated in FIG. 1. For example, the development pipeline 100 may include a stress testing stage (e.g., tests are performed repeatedly on the application or modules of the application), a soak testing stage (where the tests are performed over a longer period of time to determine whether an application or modules of the application are stable), etc. In another example, the deployment stage 125 may be divided into multiple stages (e.g., the deployment stage 125 may be divided into a small scale deployment stage to test out the deployment of the application by deploying the application to a subset of users, and a full scale deployment stage where the application may be deployed to all users of the application).

Figure 2:
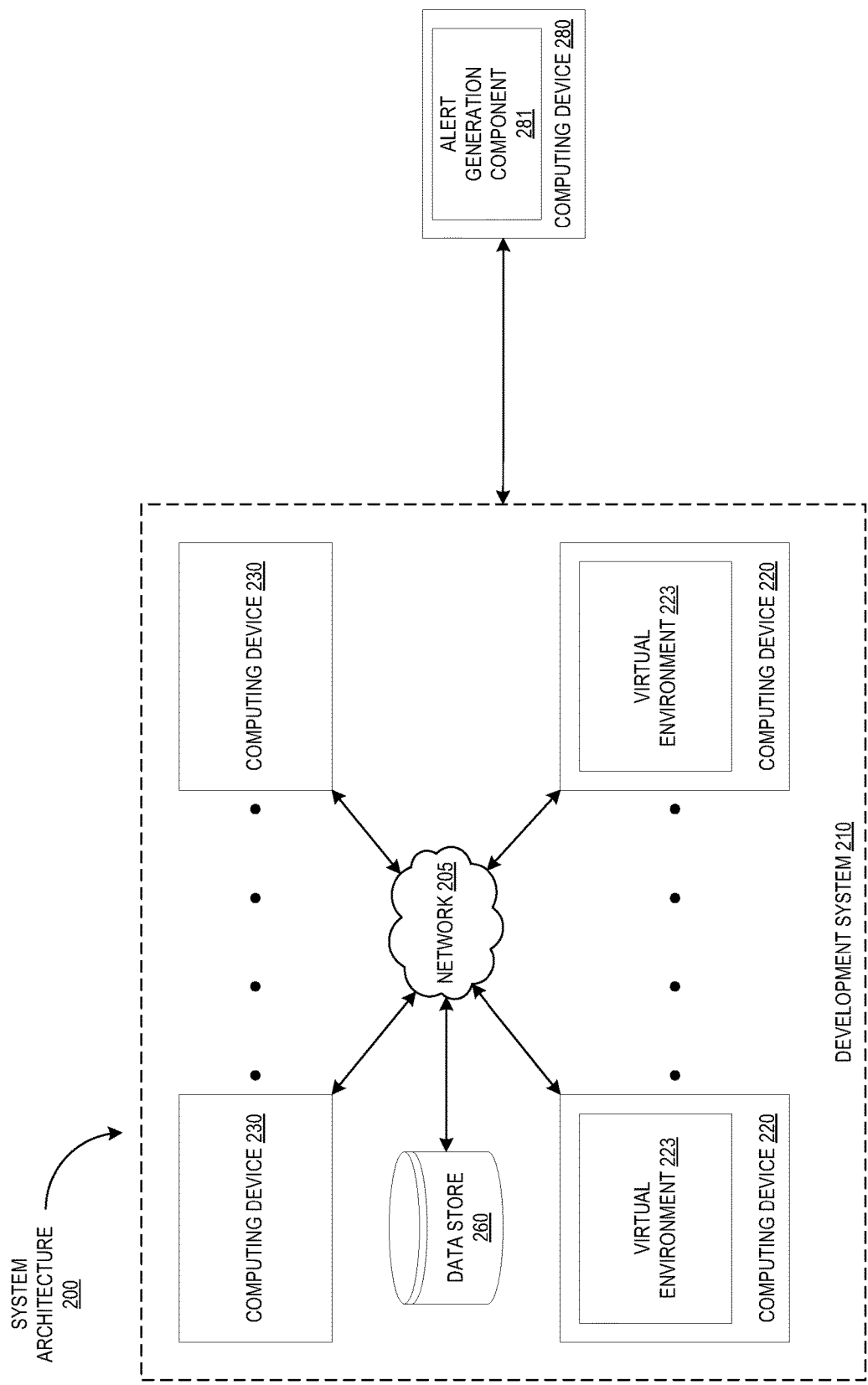
FIG. 2 is a block diagram that illustrates an example system architecture, in accordance with some embodiments of the present disclosure.

FIG. 2 is a block diagram that illustrates an example system architecture 200, in accordance with some embodiments of the present disclosure. The system architecture 200 includes a development system 210 and computing device 280. The development system 210 includes computing devices 220 and 230, a data store 260 and a network 205. The computing devices 220 and 230, and the data store 260 may be coupled to each other (e.g., may be operatively coupled, communicatively coupled, may communicate data/messages with each other) via network 205. Network 205 may be a public network (e.g., the internet), a private network (e.g., a local area network (LAN) or wide area network (WAN)), or a combination thereof. In one embodiment, network 205 may include a wired or a wireless infrastructure, which may be provided by one or more wireless communications systems, such as a Wi-Fi™ hotspot connected with the network 205 and/or a wireless carrier system that can be implemented using various data processing equipment, communication towers (e.g. cell towers), etc. The network 205 may carry communications (e.g., data, message, packets, frames, etc.) between computing devices 220 and 230, and the data store 260. The data store 260 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The computing device 280 may be coupled to the development system 210 via another network or via the network 205. Although the computing device 280 (and the alert generation component 281) is illustrate as separate from the development system 210, the computing device 280 (and the alert generation component 281) may be part of the development system 210 in other embodiments.

Each computing device (e.g., computing devices 220, 230, and 280) may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, laptop computers, tablet computers, smartphones, set-top boxes, etc. In some examples, the computing devices may comprise a single machine or may include multiple interconnected machines (e.g., multiple servers configured in a cluster). Each computing device may execute or include an operating system (OS), as discussed in more detail below. The OS of a computing device may manage the execution of other components (e.g., software, applications, etc.) and/or may manage access to the hardware (e.g., processors, memory, storage devices etc.) of the computing device.

As illustrated in FIG. 2, computing devices 220 include virtual environments 223. In one embodiment, a virtual environment 223 may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. A VM may be, for example, a hardware emulation, a full virtualization, a para-virtualization, and an operating system-level virtualization VM. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. For example, the hypervisor, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. A hypervisor (not shown) may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment 223 may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. For example, the container engine may multiplex the binaries and/or libraries of the host OS between multiple containers. The container engine may also facilitate interactions between the container and the resources of the computing device. For example, the container engine may manage requests from container to access a memory (e.g., a RAM) of the computing device 220. In another example, the container engine may manage requests from the container to access certain libraries/binaries of the host OS. The container engine may also be used to create, remove, and manage containers. In one embodiment, the container engine may be a component of a host operating system. In another embodiment, container engine may run on top of a host operating system, or may run directly on host hardware without the use of a host operating system.

As discussed above, the development system 210 may be used to develop, update, test, deploy, and maintain one or more applications (e.g., software, software applications, apps, web applications, mobile applications, mobile apps, etc.). Also as discussed above, the process of developing, testing, deploying, etc., applications may be referred to as a development pipeline. The development pipeline may have various stages (e.g., phases) and each stage may use resources (e.g., computing resources, such as RAM, storage space, processing power, network bandwidth, computing devices, VMs, containers, etc.) of the development system 210.

In one embodiment, the alert generation component 281 may monitor software jobs in a development pipeline of an application development system. The alert generation component 281 may identify build fails that occur during the triggering of a job in a development pipeline. The alert generation component 281 may analyze the build fail to determine a mode of the failure. If the alert generation component 281 determines the mode of failure of the build is a deterministic mode of failure (e.g., a type of failure that will occur a determined amount of times the build is triggered), then the alert generation component 281 determines if any software jobs are affected by the build. The alert generation component 281 generates an alert for the software jobs that are affected by the build fail. Further details regarding alert generation component 281 are described below.

Figure 3A:
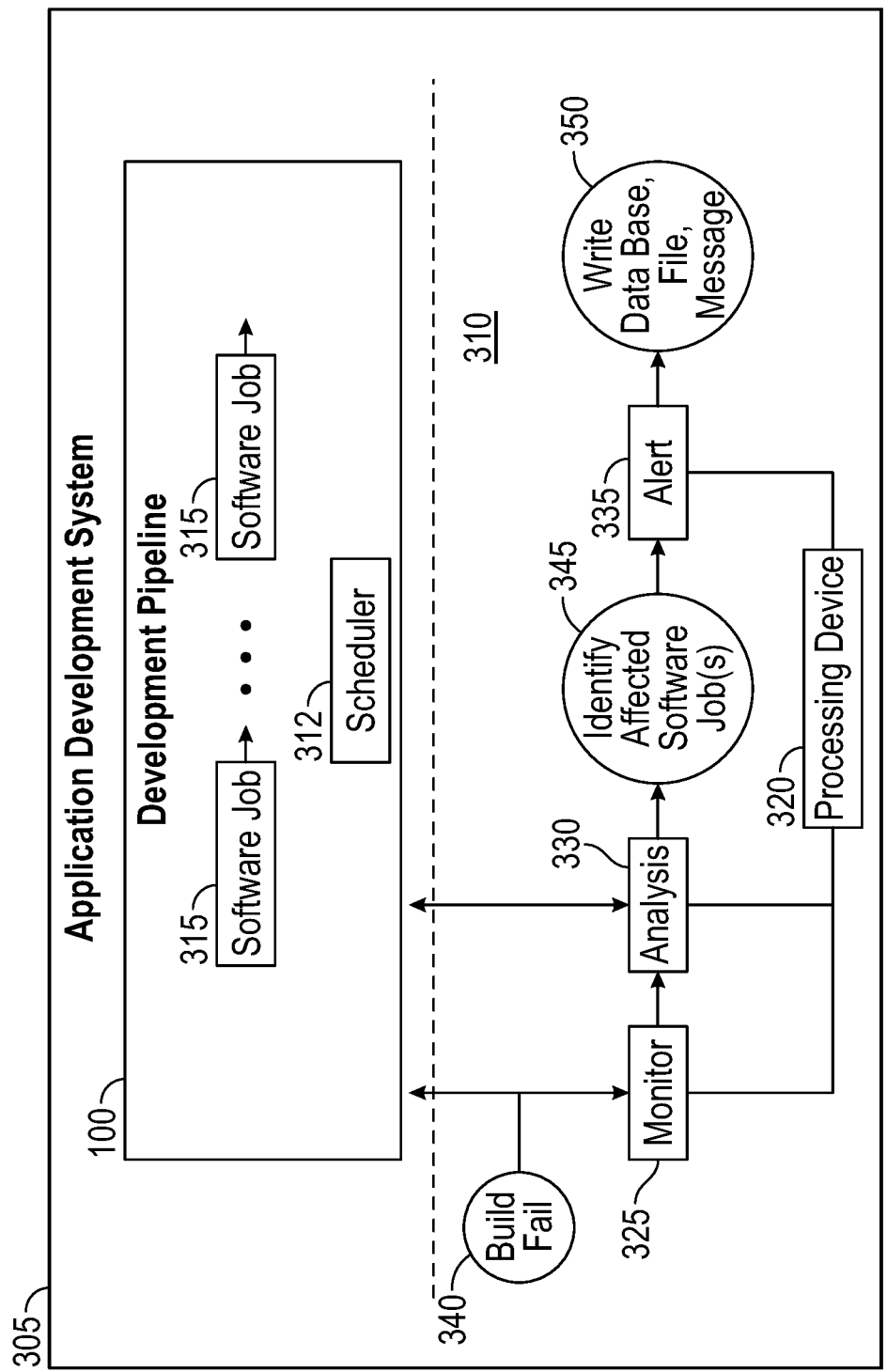
FIG. 3A is a block diagram that illustrates an example application development system with monitoring and analysis of software jobs, in accordance with some embodiments of the present disclosure.

FIG. 3A is a block diagram that illustrates an example application development system 305 with monitoring and analysis of software jobs 315, in accordance with some embodiments of the present disclosure. Software jobs 315 are placed in the development pipeline 100 (see FIG. 1), for example through a queue (not shown but readily envisioned), for development, various types of testing, and deployment of applications as described above. A monitoring system 310 monitors the software jobs 315, and may generate outputs by writing to a database or a file, or sending a message. Alternatively, the monitoring system 310 may be integrated into and thus part of the development pipeline 100.

In the embodiment shown in FIG. 3A, a processing device 320 in the monitoring system 310 has multiple modules, including a monitor module 325, analysis module 330, and alert module 335, each of which could be implemented in software, firmware, hardware, or combinations thereof in various embodiments. The monitor module 325 communicates with the development pipeline 100, more specifically with processing devices or modules such as a scheduler 312 in the development pipeline 100, in order to monitor the software jobs 315 in the development pipeline 100 and recognize any build fails. The scheduler 312 tracks jobs and builds, and which jobs were executed. In some embodiments, the scheduler 312 in the development pipeline 100 sends messages to or responds to inquiries from the monitor module 325, or maintains status information that the monitor module 325 can access. When a build fails, in one of the software jobs 315 in the development pipeline 100, the monitor module 325 identifies the software job 315 associated with the build fail 340 in view of communication with the development pipeline 100, and passes this information along to the analysis module 330.

The analysis module 330 analyzes the identified software job 315 (see FIG. 3B for further details), and analyzes other software jobs 315 in the development pipeline 100 to determine whether any of the software jobs 315 in the development pipeline 100 are affected by the detected build fail 340. Any such affected software jobs are identified by the analysis module 330. The analysis module performs the action 345, identify affected software job(s), recognizing any software job that is at risk of failure because of the utilization of the detected build fail 340. The alert module 335, upon receiving identification of a software job 315 that is affected by an identified build fail 340 from the analysis module 330, generates an alert. This may be in the form of writing a note to a database, writing a note to a file, or sending a message, for example to an administrator or other user. In one version, the alert module 335 notifies an owner of a software job 315 affected by a build fail 340. In embodiments, the alert module 335 may generate an alert by writing the alert to a database or file or generating a message/notification 350 identifying the software job 315 affected by the build fail 340. An administrator or other user receiving or otherwise becoming aware of such output from the alert module 335 may decide to take remedial action with the software job 315 affected by the build fail 340, for example pulling the software job 315 out of the development pipeline 100. Alternatively, the system could be self-directed to take remedial action upon such alert. Remedial action could be delaying or stopping a software job 315, debugging a software job 315, etc. A user responding to such an alert and fixing a software job 315 may wish to inform others working on related software jobs 315, or further embodiments of the system could do so automatically.

Figure 3B:
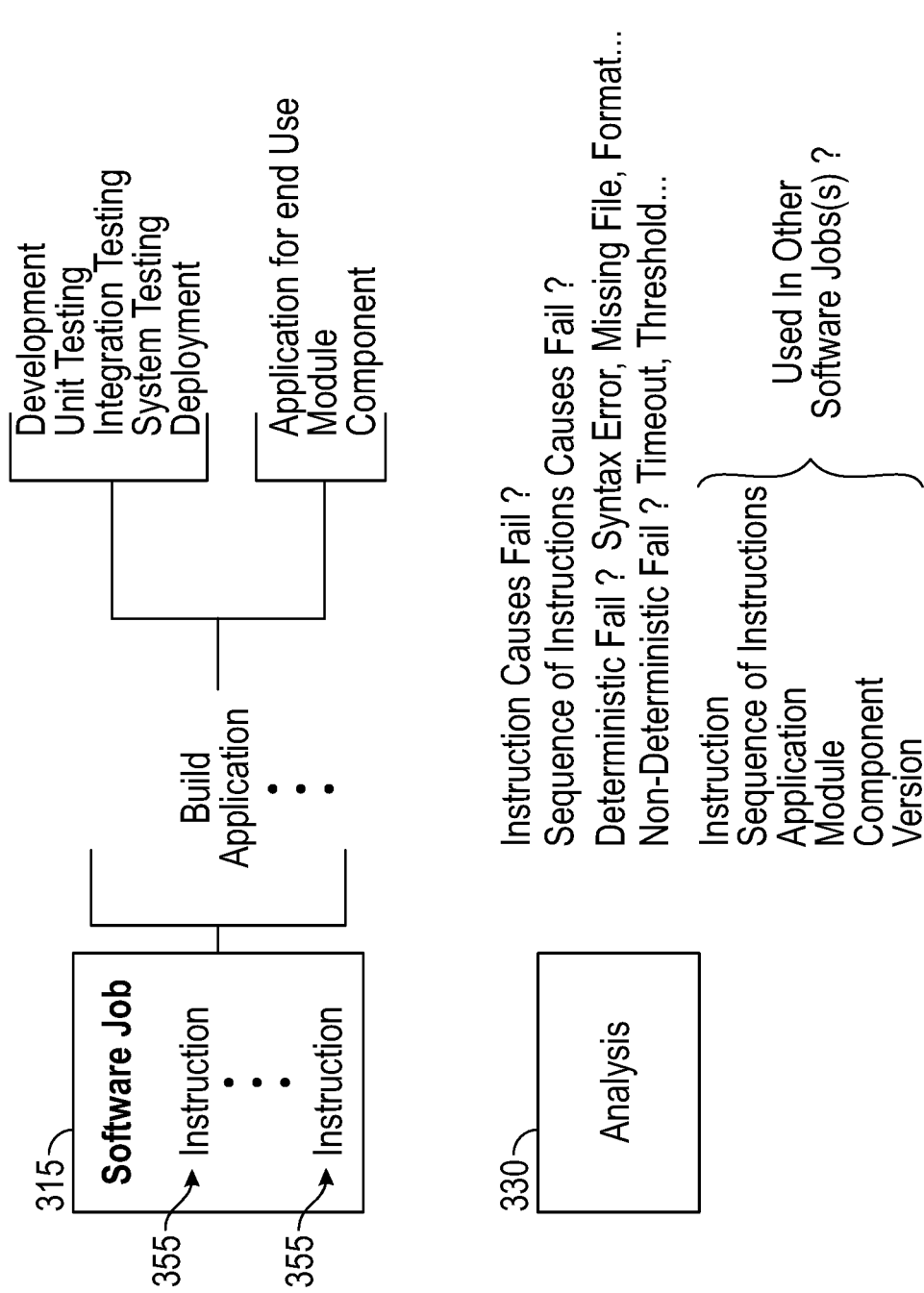
FIG. 3B depicts example details of the contents of a software job and analysis thereof, as performed in the application development system in accordance with some embodiments of the present disclosure.

FIG. 3B depicts example details of the contents of a software job 315 and analysis thereof, as performed in the application development system 305 in accordance with some embodiments of the present disclosure. Software jobs 315 typically have multiple instructions 355 in a sequence, which directs a build of an application or other activity with the application in the context of application development (see various stages in the development pipeline 100 in FIG. 1). The build of the application could be part of development, unit testing, integration testing, system testing and/or deployment of the application. And, the application itself could be an application for end-use, a module or component used in other applications, etc.

When there is a build fail 340 of a software job 315, anywhere in the development pipeline 100 (see FIG. 3A), the analysis module 330 performs analysis of the software job 315 associated with the build fail 340. Existing failure analyzing methods may be used, including commercially available products, error codes and messages from systems or subsystems in the development pipeline 100, etc., in embodiments. Various analyses of the software job 315 associated with the build fail 340 may be performed. In some embodiments, the analysis includes which instruction(s) 355 in the software job 315 caused the build fail 340. In embodiments, the analysis includes identifying a sequence of instructions 355 that caused the build fail 340. In an embodiment, the analysis includes identifying other software jobs 315 with the same instructions 355, but in a different sequence, that do not have a build fail 340. In embodiments, the analysis may include determining a mode of failure for the build fail 340. The mode of failure for the build fail 340 may be a deterministic failure or a non-deterministic failure.

In some embodiments, a deterministic failure may be a type of failure that occurs every time a build is triggers. For example, a syntax error, a missing file, incorrect format or other condition that causes a build fail every time are deterministic failures. In embodiments, a deterministic failure may be a type of failure that causes a number of build failures to exceed a threshold. For example, a type of failure that causes a number of build failures to exceed a 70% threshold may be a deterministic failure. A non-deterministic failure may be a type of failure that does not occur every time or occurs less than a threshold number of times. For example, a timeout of some component in the development infrastructure, or some other circumstance that occurs in a statistical manner may be non-deterministic failures. In some embodiments, the analysis module 330 could determine whether the number of non-deterministic build fails, or the rate of non-deterministic build fails meets or exceeds the threshold, and pass along that information to the alert module 335.

For the analysis of other software jobs 315 in the development pipeline 100, in order to identify software jobs affected by the build fail 340, the analysis module 330 may perform any of the following analyses. The analysis module 330 may determine if the instruction that causes the build fail 340 used in other software jobs 315. The analysis module 330 may identify a sequence of instructions that cause the build fail 340 that occurred in other software jobs 315. The analysis module 330 may determine if the software job 315 that has the build fail 340 is an application and if the application is used in other software jobs 315. The analysis module 330 may determine if the software job 315 that has the build fail 340 is a module and if the module used in other software jobs 315. The analysis module 330 may determine if the software job 315 that has the build fail 340 is a component and if the component is used in other software jobs 315. The analysis module 330 may determine if the software job that has the build fail 340 is a specific version, e.g., of an application, module or component, and if the version of the application, module or component is used in other software jobs 315. The analysis module 330 uses results of the above analysis to identify software jobs 315 that are affected by the identified build fail 340 specified by the monitor module 325. In some embodiments, the alert, from the alert module 335, is only for software jobs 315 affected by deterministic fails. In some embodiments, the alert from the alert module 335 includes alerts for software jobs 315 affected by non-deterministic fails that meet a defined threshold. Other information from the analysis of the software jobs 315 affected by a build fail 340 could be included in the alert, such as alerting that an instruction, sequence of instructions, application, module, component or version found in the software job 315 that has the build fail is also found in the software job 315 for which the alert is issued.

Figure 4A:
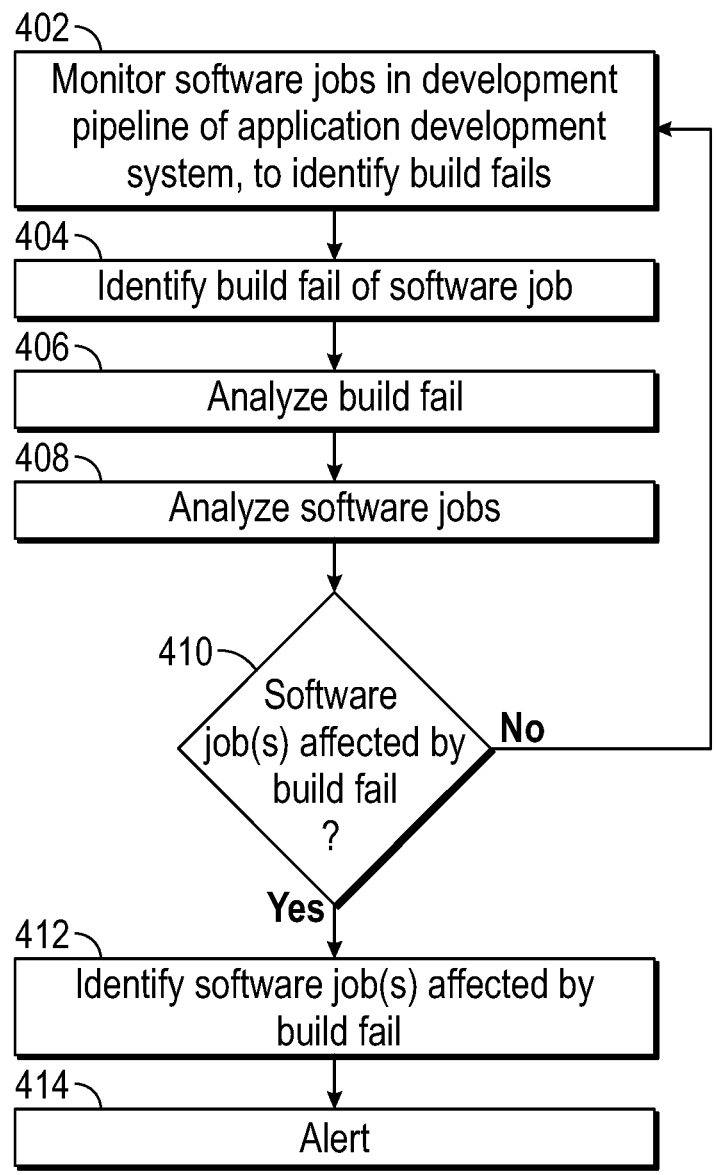
FIG. 4A is a flow diagram of a method of monitoring software jobs in an application development system, in accordance with some embodiments of the present disclosure.

FIG. 4A is a flow diagram of a method 400 of monitoring software jobs in an application development system, in accordance with some embodiments of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 400 may be performed by alert generation component 281 of FIG. 2.

With reference to FIG. 4A, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring to FIG. 4A, at block 402, the processing logic monitors software jobs in the development pipeline of the application development system, to identify build fails. Error codes, error messages, existing or new tools could be used in various embodiments.

At block 404, the processing logic identifies a build fail of a software job. This could include failure of an application, produced by or otherwise involved in an application build, anywhere in the development pipeline, not just during the build itself. For example, the build fail could occur in the development stage, unit testing stage, integration testing stage, system testing stage, or development stage (see FIG. 1).

At block 406, the processing logic analyzes the build fail. Examples of suitable analysis are given above with reference to FIG. 3B. Analysis could show the build fail is a deterministic failure type, or a non-deterministic failure type, one or both of which are of interest in various embodiments.

At block 408, the processing logic analyzes software jobs that are in the development pipeline. For example, the system could perform a code scan across all of the software jobs, looking for instructions or sequences of instructions that match the instruction(s) in the software job associated with the build fail.

At block 410, the processing logic determines whether any software jobs that are in the development pipeline are affected by the build fail. If the answer is that no software jobs in the development pipeline are affected by the build fail, method 400 proceeds to block 402, to continue monitoring software jobs in the development pipeline. If the answer is yes, one or more software jobs are affected by the build fail, method 400 proceeds to the block 412.

At block 412, the processing logic identifies software job(s) that are affected by the build fail. Such identification is in view of the analysis performed in blocks 406 and 408.

At block 414, the processing logic generates an alert associated with the software jobs that are affected by the build fail. This may be in the form of writing to a database, writing to a file, or sending a message, for example to a user, indicating the jobs that are affected by the build fail. The alert could include identification of the software job affected by the build fail, and be a warning or flag, etc.

Figure 4B:
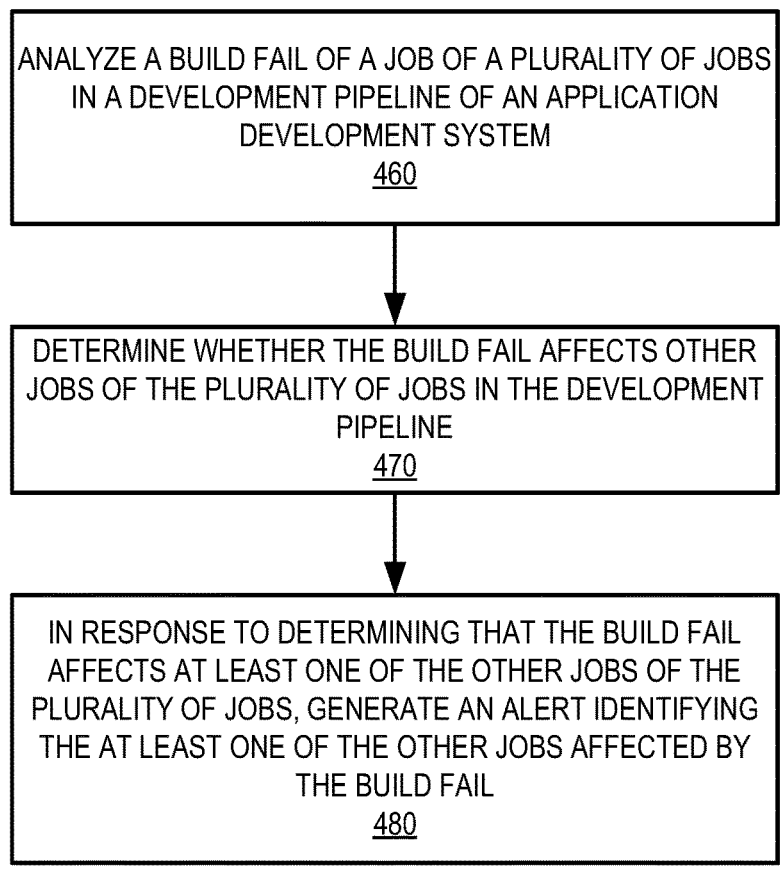
FIG. 4B is a flow diagram of a further method of monitoring software jobs in an application development system, in accordance with some embodiments of the present disclosure.

FIG. 4B is a flow diagram of a further method 450 of monitoring software jobs in an application development system, in accordance with some embodiments of the present disclosure. The method 450 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 450 may be performed by alert generation component 281 of FIG. 2.

With reference to FIG. 4B, method 450 illustrates example functions used by various embodiments. Although specific function blocks ("blocks") are disclosed in method 450, such blocks are examples. That is, embodiments are well suited to performing various other blocks or variations of the blocks recited in method 450. It is appreciated that the blocks in method 450 may be performed in an order different than presented, and that not all of the blocks in method 450 may be performed.

Referring to FIG. 4B, at block 460 the processing logic analyzes a build fail of a job of a plurality of jobs in a development pipeline of an application development system.

At block 470, the processing logic determines whether the build fail affects other jobs of the plurality of jobs in the development pipeline.

In response to determining that the build fail affects at least one of the other jobs of the plurality of jobs, at block 480, the processing logic generates an alert identifying the at least one of the other jobs affected by the build fail.

Figure 5:
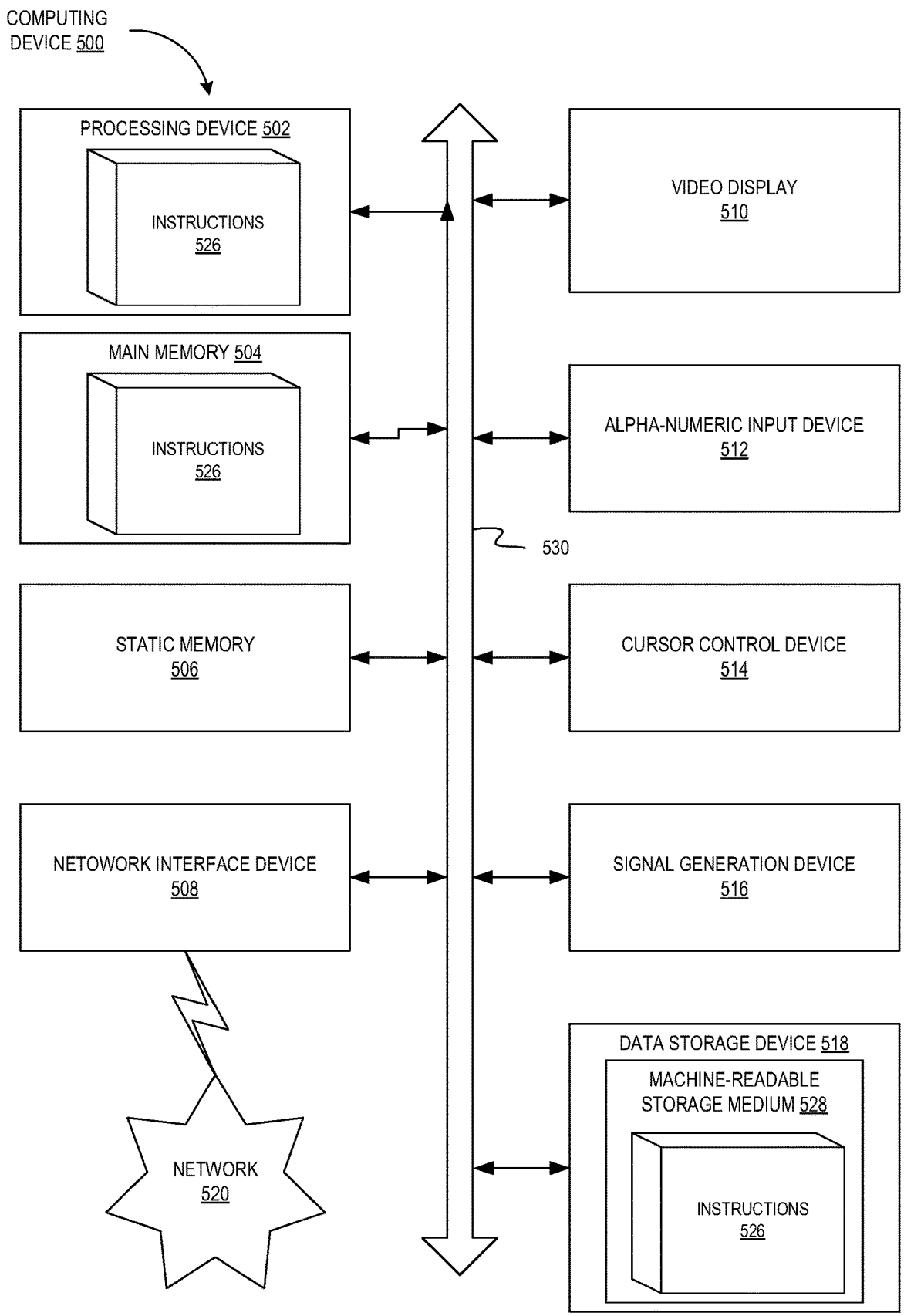
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Instructions 526 implementing a resource component (e.g., alert generation component 281 illustrated in FIG. 2) may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 6:
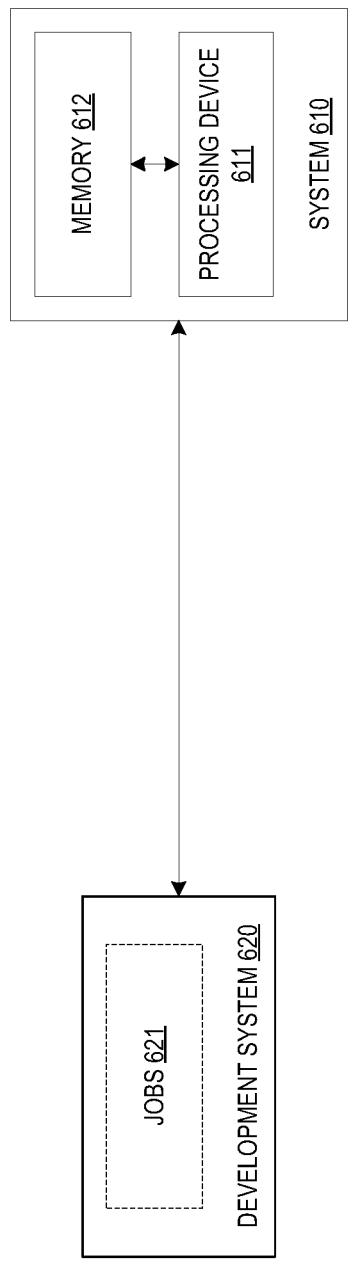
FIG. 6 is a block diagram of an example apparatus that may perform one or more of the operations described herein, in accordance with some embodiments

FIG. 6 is a block diagram of an example system 610 that may perform one or more of the operations described herein, in accordance with some embodiments. The system 610 includes a processing device 611 and a memory 612. The processing device 611 may be operatively coupled to the memory 612. The processing device 611 may analyze build fails of jobs 621 of an application development system 620 during different stages of a development pipeline for an application. It should be noted that jobs 621 are shown for illustrative purposes only and are not physical components of development system 620. The processing device 611 may also determine which jobs 621, if any, are affect by a particular build fail. The processing device 611 may further generate an alert identifying jobs 621 that are affected by the particular build fail.

Unless specifically stated otherwise, terms such as "analyzing," "determining," "configuring," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a plurality of build jobs using a development pipeline of an application development system at a processing device, wherein the processing device comprises a monitoring module and an analysis module;
   in response to receiving the plurality of build jobs, automatically performing the steps of:
      executing the plurality of jobs on the processing device;
      analyzing, by the monitoring module, a build fail of a job of the plurality of jobs executing on the processing device;
      identifying, by the monitoring module, the job that has a build fail to the analysis module;
      determining, by the analysis module, that the build fail of the job is a deterministic failure, wherein determining that the build fail of the job is a deterministic failure comprises:
         determining a number of failures associated with the build fail of the job;
         determining whether the number of failures associated with the build fail of the job exceeds a threshold; and
         in response to determining that the number of failures associated with the build fail of the job exceeds a threshold, determining that the build fail is the deterministic failure type;
      in response to determining, by the analysis module, that the build fail of the job is a deterministic failure, determining, by the analysis module, whether the build fail affects other jobs of the plurality of jobs in the development pipeline, wherein the determining comprises:
         identifying a sequence of instructions associated with the build fail;
         determining that additional jobs of the plurality of jobs comprise the same instructions as the sequence of instructions but in a different sequence and that the additional jobs of the plurality of jobs do not have a build fail to determine that the sequence of instructions is a cause of the build fail; and
         comparing the sequence of instructions against each of the plurality of jobs in the development pipeline by performing a code scan to determine whether the sequence of instructions is included in at least one of the other jobs of the plurality of jobs in the development pipeline; and
      in response to determining, by the analysis module, that the build fail affects at least one of the other jobs of the plurality of jobs:
         automatically performing, by the processing device, a remediation action, wherein the remediation action comprises at least one of delaying, stopping, or debugging the at least one of the other jobs in the development pipeline affected by the build fail.

2. The method of claim 1, wherein the development pipeline comprises a continuous integration continuation delivery (CI/CD) pipeline.

3. The method of claim 1, wherein analyzing, by the analysis module, the build fail of the job comprises identifying a version associated with the build fail and wherein determining, by the analysis module, whether the build fail affects other jobs of the plurality of jobs comprises: determining whether the other jobs of the plurality of jobs comprise the version associated with the build fail.

4. A non-transitory computer-readable storage medium including instructions that, when executed by a processing device, cause the processing device to:
   receive a plurality of build jobs using a development pipeline of an application development system at a processing device, wherein the processing device comprises a monitoring module and an analysis module;
   in response to receiving the plurality of build jobs, automatically cause the processing device to:
      execute the plurality of jobs on the processing device;
      analyze, by the monitoring module, a build fail of a job of the plurality of jobs executing on the processing device;

identify, by the monitoring module, the job that has a build fail to the analysis module;
determine, by the analysis module, that the build fail of the job is a deterministic failure, wherein to determine that the build fail of the job is a deterministic failure, the processing device is to:
  determine a number of failures associated with the build fail of the job;
  determine whether the number of failures associated with the build fail of the job exceeds a threshold; and
  in response to determining that the number of failures associated with the build fail of the job exceeds a threshold, determine that the build fail is the deterministic failure type;
in response to determining, by the analysis module, that the build fail of the job is a deterministic failure, determine, by the analysis module, whether the build fail affects other jobs of the plurality of jobs in the development pipeline, wherein to determine whether the build fail affects other jobs the processing device is to:
  identify a sequence of instructions associated with the build fail;
  determine that additional jobs of the plurality of jobs comprise the same instructions as the sequence of instructions but in a different sequence and that the additional jobs of the plurality of jobs do not have a build fail to determine that the sequence of instructions is a cause of the build fail; and
  compare the sequence of instructions against each of the plurality of jobs in the development pipeline by performing a code scan to determine whether the sequence of instructions is included in at least one of the other jobs of the plurality of jobs in the development pipeline; and
in response to determining, by the analysis module, that the build fail affects at least one of the other jobs of the plurality of jobs:
  automatically perform, by the analysis module, a remediation action, wherein the remediation action comprises at least one of delaying, stopping, or debugging the at least one of the other jobs in the development pipeline affected by the build fail.

5. The non-transitory computer-readable storage medium of claim 4, wherein the job further comprises a module or component that caused the build fail and wherein to determine, by the analysis module, whether the build fail affects other jobs of the plurality of jobs, the processing device is to: determine whether the other jobs of the plurality of jobs comprise the module or component that caused the build fail.

6. The non-transitory computer-readable storage medium of claim 4, wherein to analyze, by the analysis module, the build fail of the job, the processing device is to identify a version associated with the build fail and wherein to determine, by the analysis module, whether the build fail affects other jobs of the plurality of jobs, the processing device is to: determine whether the other jobs of the plurality of jobs comprise the version associated with the build fail.

7. A system, comprising:
a memory; and
a processing device, operatively coupled to the memory, to:
  receive a plurality of build jobs using a development pipeline of an application development system at the processing device, wherein the processing device comprises a monitoring module and an analysis module;
  in response to receiving the plurality of build jobs, automatically cause the processing device to:
    execute the plurality of jobs on the processing device;
    analyze, by the monitoring module, a build fail of a job of the plurality of jobs executing on the processing device;
    identify, by the monitoring module, the job that has a build fail to the analysis module;
    determine, by the analysis module, that the build fail of the job is a deterministic failure, wherein to determine that the build fail of the job is a deterministic failure, the processing device is to:
      determine a number of failures associated with the build fail of the job;
      determine whether the number of failures associated with the build fail of the job exceeds a threshold; and
      in response to determining that the number of failures associated with the build fail of the job exceeds a threshold, determine that the build fail is the deterministic failure type;
    in response to determining, by the analysis module, that the build fail of the job is a deterministic failure, determine, by the analysis module, whether the build fail affects other jobs of the plurality of jobs in the development pipeline, wherein to determine whether the build fail affects other jobs the processing device is to:
      identify a sequence of instructions associated with the build fail;
      determine that additional jobs of the plurality of jobs comprise the same instructions as the sequence of instructions but in a different sequence and that the additional jobs of the plurality of jobs do not have a build fail to determine that the sequence of instructions is a cause of the build fail; and
      compare the sequence of instructions against each of the plurality of jobs in the development pipeline by performing a code scan to determine whether the sequence of instructions is included in at least one of the other jobs of the plurality of jobs in the development pipeline; and
    in response to determining, by the analysis module, that the build fail affects at least one of the other jobs of the plurality of jobs:
      automatically perform, by the analysis module, a remediation action, wherein the remediation action comprises at least one of delaying, stopping, or debugging the at least one of the other jobs in the development pipeline affected by the build fail.

8. The system of claim 7, wherein to analyze, by the analysis module, the build fail of the job, the processing device is to identify a version associated with the build fail and wherein to determine, by the analysis module, whether the build fail affects other jobs of the plurality of jobs, the processing device is to: determine whether the other jobs of the plurality of jobs comprise the version associated with the build fail.

* * * * *